United States Patent Office 3,202,698
Patented Aug. 24, 1965

3,202,698
THIO AND OXY SUBSTITUTED AROMATIC HYDRAZONES OF CARBONYL CYANIDE
William W. Prichard, Hockessin, Del., assignor to E. I. du Pont de Nemours and Company, Wilmington, Del., a corporation of Delaware
No Drawing. Filed June 21, 1962, Ser. No. 204,050
5 Claims. (Cl. 260—465)

This invention relates to new thio and oxy substituted aromatic hydrazones of carbonyl cyanide (or aromatic azomalononitriles). More particularly this invention relates to arylthio and aryloxy substituted aromatic hydrazones of carbonyl cyanide.

It is an object of this invention to provide new substituted aromatic hydrazones of carbonyl cyanide (or aromatic azomalononitriles). A further object is to provide selected substituted aromatic hydrazones which have insecticidal activity and which are effective as uncouplers for biological oxidative phosphorylation. Other objects will appear hereinafter.

These and other objects of this invention are accomplished by the following compounds, namely, the arylthioaryl- and aryloxyaryl - hydrazones of carbonyl cyanide. These new compounds can exist in tautomeric forms represented by the formulas (A)

$$Ar-X-Ar-NH-N=C(CN)_2$$

wherein X is O or S, i.e., aromatic sulfied and aromatic ether hydrazones of carbonyl cyanide, and (B)

$$Ar-X-Ar-N=N-CH(CN)_2$$

wherein X is O or S, i.e., arylthioarylazomalononitriles (or arylmercaptoarylazomalononitriles) and aryloxyarylazomalononitriles. In the above formulas, each Ar represents an aromatic radical of 6–12 carbons. Thus, both Ar groups taken together have 12 and not over 24 carbons per molecule. Physical measurements suggest that the first structure (A) is the principal form of this class of compounds and the new compounds of this invention are accordingly referred to by name, based on this structure, in the description that follows. More precisely, the compounds are defined as aromatic thio and oxy derivatives of aromatic hydrazones of carbonyl cyanide.

Particularly preferred are the compounds having two benzenoid groups. These can be represented by the formula

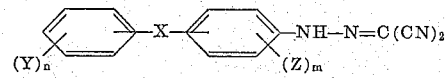

where Y and Z are halogen, of atomic number 9–35 inclusive, lower alkoxy, or lower alkyl, $n$ and $m$ are cardinal numbers of 0 to 3 inclusive, and X is oxygen or sulfur.

The compounds of this invention include those as represented in Formulas A and B above. The aromatic groups each have at least six carbons and may have additional inert substituents (i.e., nuclear groups non-reactive with amino groups or reagents employed for the preparation of the new products of this invention), e.g., as in phenyl, diphenyl, tolyl, naphthyl, chlorophenyl, dichlorophenyl, fluorophenyl, bromophenyl, methoxyphenyl, butyloxphenyl, etc., wherein the additional inert substituents include hydrocarbon, halogen (particularly of atomic number of not over 35), and alkoxy of lower alkyl.

The new aromatic thio- and oxyarylhydrazones of carbonyl cyanide of this invention are solids. They are crystalline and exhibit solubility in organic solvents. They are generally yellow to orange in color. Although they are not soluble in water, particularly if the pH is on the acid side, they are generally soluble in aqueous solutions containing a small amount of a basic material, e.g., sodium bicarbonate or sodium carbonate.

The new compounds of this invention are obtained by reaction of malononitrile with a diazonium salt of an aromatic thio- or oxy-substituted aromatic amine, i.e., $ArSArN_2^+$ and $ArOArN_2^+$. The general technique for the preparation of the new compounds is more completely described by reference to examples which follow. Suitable aromatic thio (or optionally named mercapto) aromatic amines that can be reacted as their diazonium salts with malononitrile include 4-(2-isopropylphenylthio)aniline, 4-(4-ethoxyphenylthio)aniline, 4-(β-naphthylthio)aniline, 2-methyl-4-(3-bromophenylthio)aniline, 4-methoxy-2-(4-biphenylthio)aniline, and 3 - ethoxy - 2-(2,5-dimethylphenylthio)aniline. The above are thus converted to p-(2 - isopropylphenylthio)phenylhydrazone of carbonyl cyanide, p-(4-ethoxyphenylthio)phenylhydrazone of carbonyl cyanide, p - (β - naphthylthio)phenylhydrazone of carbonyl cyanide, p-(3-bromophenylthio)-o-tolylhydrazone of carbonyl cyanide, o-(4-biphenylthio)-p-methoxyphenylhydrazone of carbonyl cyanide, and o-(2,5-dimethylphenylthio) - m - ethoxyphenylhydrazone of carbonyl cyanide, respectively. Suitable aryloxy aromatic amines that undergo this reaction include m-phenoxyaniline, p-(α-naphthoxy)aniline, and 5-phenoxy - 1 - aminonaphthalene which also, in the form of their diazonium salts, react with malononitrile to give m-phenoxyphenylhydrazone of carbonyl cyanide, p-(α-napthoxy)phenylhydrazone of carbonyl cyanide, and 5-phenoxy-1-naphthylhydrazone of carbonyl cyanide.

The following examples, in which the parts are by weight, further illustrate the preparation and properties of the new compounds of this invention.

EXAMPLE I p-Phenylthiophenylhydrazone of carbonyl cyanide

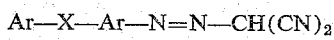

A solution of 7.5 g. of p-aminodiphenylsulfide in 20 ml. of conc. hydrochloric acid, 40 ml. of water, and 50 ml. of tetrahydrofuran was cooled to 0° C. and diazotized with a solution of 2.6 g. of sodium nitrite in 25 ml. of water. The mixture was allowed to stand for 15 minutes at 0–10° C. A solution of 2.44 g. of malononitrile in 20 ml. of water was then added, followed by sufficient 10% sodium hydroxide solution to make the mixture strongly basic. The mixture was filtered and acidified with hydrochloric acid. The brown, finely divided precipitate of p-phenylthiophenylhydrazone of carbonyl cyanide was filtered off and dried. It weighed 9 g. (85% yield) and melted at 148–152° C. Recrystallization from ethyl alcohol raised the melting point to 152–153° C.

Analysis.—Calcd. for $C_{15}H_{10}N_4S$: N, 10.14; S, 11.50. Found: N, 20.31; S, 11.52.

EXAMPLE II p-(4-chlorophenylthio)phenylhydrazone of carbonyl cyanide

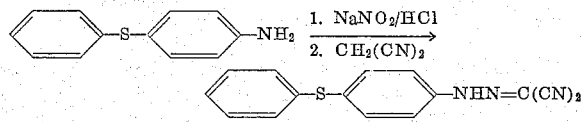
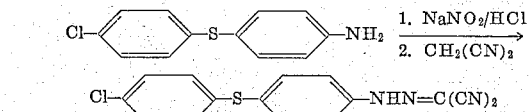

A solution of 12 g. of 4-chloro-4'-aminodiphenylsulfide in 30 ml. of water, 15 ml. of concentrated hydrochloric acid, and 50 ml. of tetrahydrofuran was cooled to 0° C. and diazotized with a solution of 3.4 g. sodium nitrite in 15 ml. of water. The mixture was allowed to stand for 15 minutes at 0–5° C. A solution of 3.3 g. of malononitrile in 20 ml. of water was added, followed by 100 ml. of 10% sodium hydroxide solution. The mixture was filtered, the filtrate acidified with dilute hydrochloric acid, and the precipitate filtered off. Recrystallization from ethyl alcohol gave 11 g. (70% yield) of p-(4-chlorophenylthio)phenylhydrazone of carbonyl cyanide melting at 186° C.

*Analysis.*—Calcd. for $C_{15}H_9N_4SCl$: N, 17.89; Cl, 11.32. Found: N, 18.16; Cl, 11.50.

EXAMPLE III

*p-(4-tolylthio)phenylhydrazone of carbonyl cyanide*

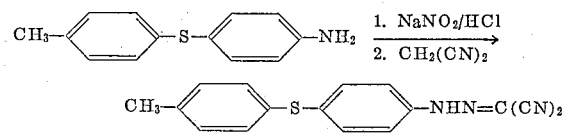

A solution of 4 g. of 4-methyl-4'-aminodiphenylsulfide in 10 ml. of water, 5 ml. of conc. hydrochloric acid, and 20 ml. of tetrahydrofuran was cooled to 0° C. and diazotized with a solution of 1.3 g. sodium nitrite in 5 ml. of water. The mixture was allowed to stand for 15 minutes at 0–5° C. A solution of 1.2 g. of malononitrile in 10 ml. of water was added, followed by 35 ml. of malononitrile in 10 ml. of water was added, followed by 35 ml. of 10% sodium hydroxide solution. The solution was poured into dilute hydrochloric acid and the orange-brown precipitate filtered off. Recrystallization from chloroform gave 2.5 g. (43% yield) of p-(4-tolylthio)phenylhydrazone of carbonyl cyanide melting at 187–188° C.

*Analysis.*—Calcd. for $C_{16}H_{12}N_4S$: C, 65.75; H, 4.14; N, 19.17. Found: C, 64.07; H, 3.90; N, 18.67.

EXAMPLE IV

*o-(Phenylthio)phenylhydrazone of carbonyl cyanide*

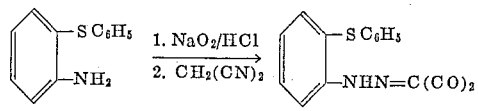

A solution of 21 g. of o-(phenylthio)-aniline hydrochloride in 15 ml. conc. hydrochloric acid, 50 ml. water, and 50 ml. of tetrahydrofuran was cooled to 0° C. and diazotized with a solution of 6.3 g. of sodium nitrite in 30 ml. of water. After 15 minutes at 0–5° C., a solution of 5.9 g. of malononitrile in 50 ml. of water was added to the diazonium salt solution, followed by 100 ml. of 10% sodium hydroxide solution. The mixture was filtered and acidified with dilute hydrochloric acid. The orange-colored precipitate of o-(phenylthio)-phenylhydrazone of carbonyl cyanide was filtered off and recrystallized twice from absolute alcohol. It melted at 109–110° C. The yield was 3.7 g. (15%).

*Analysis.*—Calcd. for $C_{15}H_{10}N_4S$: N, 20.14; S, 11.50. Found: N, 19.49; S, 11.63.

EXAMPLE V

*p-(2,5-dichlorophenylthio)phenylhydrazone of carbonyl cyanide*

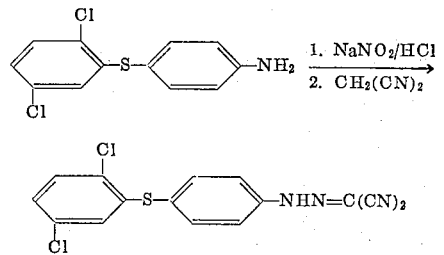

p-(2,5-dichlorophenylthio)aniline was prepared by Raney nickel-catalyzed hydrogenation of 2,5-dichloro-4'-nitrodiphenylsulfide. The amine was a low melting solid; accordingly, it was not purified, but was converted directly to and isolated as its hydrochloride salt. A suspension of 16.7 g. of p-(2,5-dichlorophenylthio)aniline hydrochloride in 30 ml. of water, 15 ml. of conc. hydrochloric acid and 50 ml. of tetrahydrofuran was cooled to 0° C. and diazotized with 3.8 g. of sodium nitrite dissolved in 20 ml. of water. After standing for 15 minutes at 0° C., a solution of 3.6 g. of malononitrile in 25 ml. of water was added followed by 100 ml. of 10% sodium hydroxide solution. The mixture was acidified with dilute hydrochloric acid and the yellow precipitate of p-(2,5-dichlorophenylthio)-phenylhydrazone of carbonyl cyanide filtered off. After air drying, the sample weighed 17 g. (90%). A portion of this material, recrystallized from a mixture of benzene (four parts) and tetrahydrofuran (two parts), melted at 218–219° C. Its infrared spectrum showed the expected absorption bands at 4.5μ (C≡N) and at 3.1μ (NH).

*Analysis.*—Calcd. for $C_{15}H_8N_4SCl_2$: N, 16.15; Cl, 20.44. Found: N, 15.58; Cl, 20.27.

EXAMPLE VI

*p-phenoxyphenylhydrazone of carbonyl cyanide*

A 25 g. sample of p-phenoxynitrobenzene was reduced by refluxing with excess tin and 3 N hydrochloric acid for 16 hours. The reaction mixture was then filtered and the filtrate made alkaline. A bright blue color formed, which was probably due to an indophenol by-product. A crystalline amine precipitated from the alkaline solution. This was removed by filtration and the filtrate extracted with ether. A combination of the solid with the product recovered from the ether extract gave 10.6 g. of amine, melting at 82–84° C. (reported melting point, 84–85°). The amine was dissolved in dilute hydrochloric acid and one equivalent of sodium nitrite in water added. Six grams of malononitrile (a slight excess) was added and the solution made alkaline with sodium hydroxide. The alkaline solution was filtered, acidified, and the orange precipitate which formed isolated by filtration. After recrystallization from chloroform, 6.7 g. of bright yellow crystals, melting at 173–174.5° C., were obtained. The infrared pattern was consistent with the assigned structure for p-phenoxyphenylhydrazone of carbonyl cyanide.

EXAMPLE VII

*Synthesis of p-(4-tolyloxy)phenylhydrazone of carbonyl cyanide*

A mixture of 8 grams of 4-methyl-4'-nitrodiphenyl ether, 30 ml. of water, 10 ml. of conc. hydrochloric acid and 50 ml. of tetrahydrofuran was cooled to 0° C. and diazotized with a solution of 2.8 grams of sodium nitrite in 15 ml. of water. To the diazonium salt solution was added 2.7 grams of malononitrile in 20 ml. water, followed by a sufficient amount of 10% sodium hydroxide solution to make the mixture strongly basic. The clear solution was poured into excess dilute hydrochloric acid, and the yellow precipitate filtered off, air dried and recrystallized from absolute alcohol. There was obtained 9.8 grams (90% yield) of yellow needles of p-(4-tolyloxy)phenylhydrazone of carbonyl cyanide, melting at 164.5–165.5° C.

*Analysis.*—Calcd. for $C_{16}H_{12}N_4O$: C, 69.55; H, 4.38; N, 20.28. Found: C, 69.73; H, 4.41; N, 20.74.

Compositions containing the new compounds are easy to formulate, since the new compounds are soluble in aqueous dilute sodium carbonate. Also, compositions containing these compounds in a carrier, e.g., an inert medium such as in aqueous or organic liquids or solvents are easily prepared.

The compounds of this invention have insecticidal activity. For example, when incorporated in boll weevil diet at 0.01% concentration, the compounds of Examples II and III killed 50% of the insects in one day and 90% in four days. The compound of Example IV gave a 100% kill of the Two-spotted Mite when sprayed as a 1% solution in an inert solvent. The compound of Example II, when sprayed on bean leaves, repelled the Mexican Bean Beetle.

Compounds of this invention are unusually effective as uncouplers for biological oxidative phosphorylation. In this well-recognized test the compounds are much more effective than 2,4-dinitrophenol, which is accepted as a highly effective uncoupler of oxidative phosphorylation. Thus, for isolated beef heart mitochondria, p-tolylthiophenylhydrazone of carbonyl cyanide at a concentration of 2 to 5 parts per billion effected 50% uncoupling; whereas, 2,4-dinitrophenol required a concentration of $1.0–1.5 \times 10^{-5}$ mole per liter (i.e., about 1000 times as much) to produce the same results. Similar activity to the thio derivatives was shown by p-phenoxyphenylhydrazone of carbonyl cyanide.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Aromatic hydrazones of carbonyl cyanide of the formula $$\text{Ar}—\text{X}—\text{Ar}—\text{NH}—\text{N}=\text{C}(\text{CN})_2$$

wherein each Ar represents an aromatic hydrocarbon group of 6–12 carbon atoms having up to three substituents selected from the class consisting of halogen of atomic number 9–35 inclusive, lower alkoxy, and lower alkyl, and X represents an atom selected from the group consisting of oxygen and sulfur.

2. Aromatic hydrazones of carbonyl cyanide of the formula $$\text{Ar}—\text{O}—\text{Ar}—\text{NH}—\text{N}=\text{C}(\text{CN})_2$$

wherein each Ar represents an aromatic hydrocarbon group containing 6–12 carbon atoms and having up to three halogen atoms of atomic number 9–35 inclusive as substituents thereon.

3. Aromatic hydrazones of carbonyl cyanide of the formula $$\text{Ar}—\text{S}—\text{Ar}—\text{NH}—\text{N}=\text{C}(\text{CN})_2$$

wherein each Ar represents an aromatic hydrocarbon group containing 6–12 carbon atoms and having up to three lower alkyl groups as substituents thereon.

4. Aromatic hydrazones of carbonyl cyanide of the formula

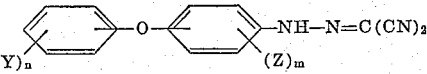

wherein Y and Z are selected from the class consisting of halogen of atomic number 9–35 inclusive, lower alkoxy, and lower alkyl and $n$ and $m$ are cardinal numbers of 0 to 3 inclusive.

5. Aromatic hydrazones of carbonyl cyanide of the formula

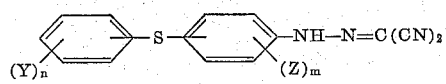

wherein Y and Z are selected from the class consisting of halogen of atomic number 9–35 inclusive, lower alkoxy, and lower alkyl and $n$ and $m$ are cardinal numbers of 0 to 3 inclusive.

References Cited by the Examiner

UNITED STATES PATENTS 2,658,889  10/53  Goldberg et al. _____ 260—465
3,062,635  11/62  Acker et al. _____ 167—30

OTHER REFERENCES

Conant and Blatt: "The Chemistry of Organic Compounds," 1952, The Macmillan Co., New York, N.Y., page 335.

CHARLES B. PARKER, *Primary Examiner.*